April 21, 1970   G. CARTIER   3,508,119
FLASHER UNIT FOR A VEHICLE
Filed June 19, 1967   2 Sheets-Sheet 1

INVENTOR
Gaston Cartier
BY
Alexander Dowell
ATTORNEY

United States Patent Office 3,508,119
Patented Apr. 21, 1970

3,508,119
FLASHER UNIT FOR A VEHICLE
Gaston Cartier, 8 Avenue de la Liberation,
Cluses, France
Filed June 19, 1967, Ser. No. 647,066
Claims priority, application France, Dec. 5, 1966,
48,023
Int. Cl. H01h 47/22, 61/06; B60q 1/38
U.S. Cl. 317—132                           4 Claims

ABSTRACT OF THE DISCLOSURE

A flasher unit for a vehicle has the usual direction indication lamps 1–4 (FIGURE 1) and a selector switch 5 to select the indicator required. The flashing is provided by a tumbler switch 21 which is operated by an unstable spring element which can be tripped mechanically by spring blade 18 which is itself stressed by a wire 19. Current can flow through the wire 19, and the expansion of the wire relaxes the blade 18 and trips the switch 21, so that the current by-passes the wire. The circuit therefore alternately includes and by-passes the wire 19 to produce flashing.

Figure 1:
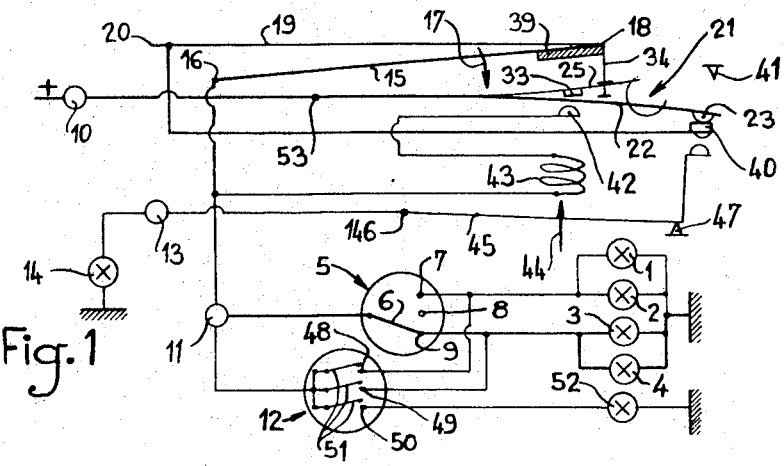

A warning switch 12 connects all the lamps to the current supply but retains the flashing effect.

---

The present invention relates to improvements to flasher units of the kind used mainly on motor cars or lorries to ensure signalling.

It is known that the flasher units known up to the presents are difficult to adapt to widely different types of vehicles, that is to say on which the indicator lamps to be controlled are of varying power.

The present invention aims mainly at avoiding this disadvantage and at creating in addition a flasher unit able to satisfy the new demands of the highway code. In particular, it is designed to control a type of signalling known as "warning" or "emergency" which consists of making all the lights of the vehicle flash simultaneously on the right as well as the left, for example in case of breakdown and stopping on a motorway or on a trunk road.

According to this invention a flasher unit for a vehicle includes a source of electric power, one or more lamps, a two position tumbler switch and an electrically energised thermally responsive control device which controls the tumber switch mechanically, and the tumber switch being adapted to connect the power source to the lamp or lamps via the control device in one position and bypassing the control device in the other position, whereby the control device is subjected to alternate heating and cooling to produce switching of the tumbler switch, thereby causing flashing of the lamp or lamps.

Preferably the control device comprises an electric resistance wire having a high length-variation to applied-current factor, the wire being attached to one end of a spring blade to hold the blade against its spring loading, expansion of the wire permitting the blade to relax in response to its spring load, the relaxation of the blade providing the mechanical operation of the tumbler switch.

In a preferred arrangment adapted to signal "warning" or "emergency," the unit includes two lamps or two sets of lamps positioned on the vehicle for direction indication, a selector switch between the tumbler switch and the lamp or lamps, adapted to direct the supply of electric current to one or other of the two lamps or sets of lamps, and an emergency or warning switch, adapted to short circuit the selector switch, to supply current to all the lamps simultaneously whilst retaining the flashing effect of the control device and tumbler switch.

A flasher unit according to a preferred form of the invention comprises a flexible blade which can be deformed by a heating wire to one of the ends of which it is attached, the length of this heating wire varying appreciably according to whether it is traversed or not by a strong electric current, and the oscillating end of this blade is attached to a fork which operates a swinging mechanism with a cylindrical spring, and having unstable equilibrium, of the kind known as a "tumbler," this system being designed to trip as soon as the heating wire lengthens, which allows the indicator lamps to be supplied directly, without the current passing through the heating wire, which then cools and makes the unstable mechanism swing in the opposite direction and extinguish the lamps before beginning a new cycle. Given that this arrangement ensures the supply of the flashing lamps directly throughout their main lighting phase, it will be seen that this avoids all necessity of proportioning the power of these lamps to the resistance of the filament. This permits a special emergency switch to be provided which when closed ensures the simultaneous flashing of all the lamps of the vehicle.

Figure 2:
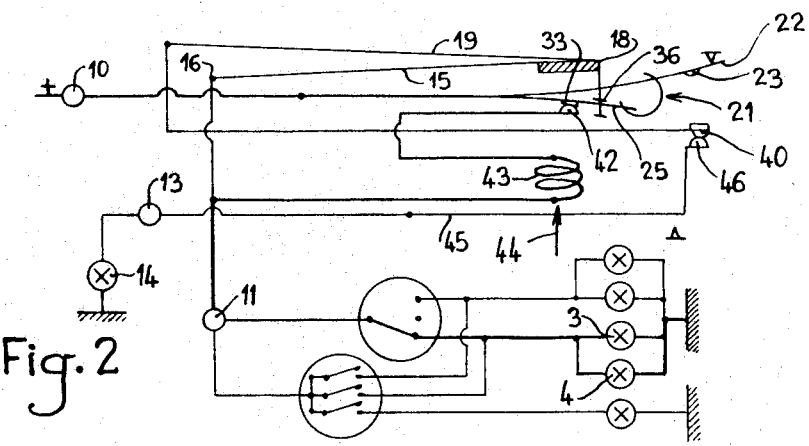
Figure 3:
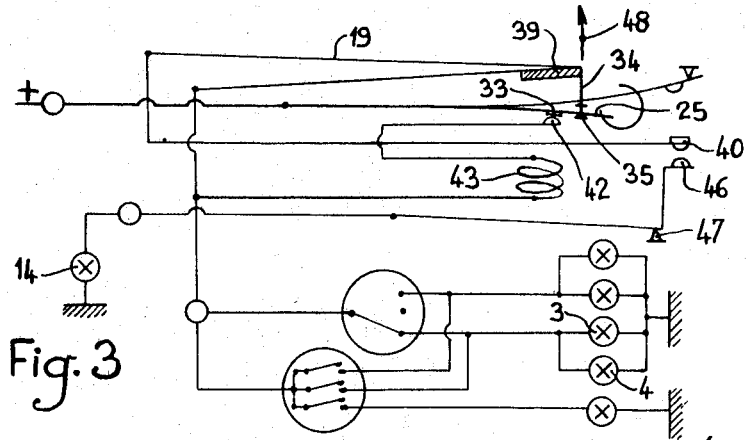
Figure 4:
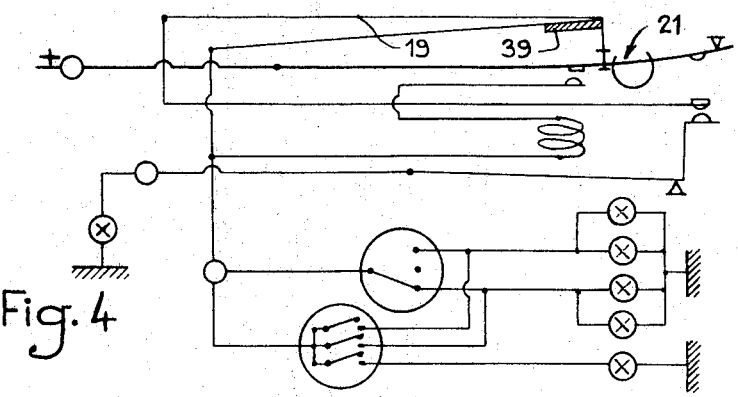
Figure 5:
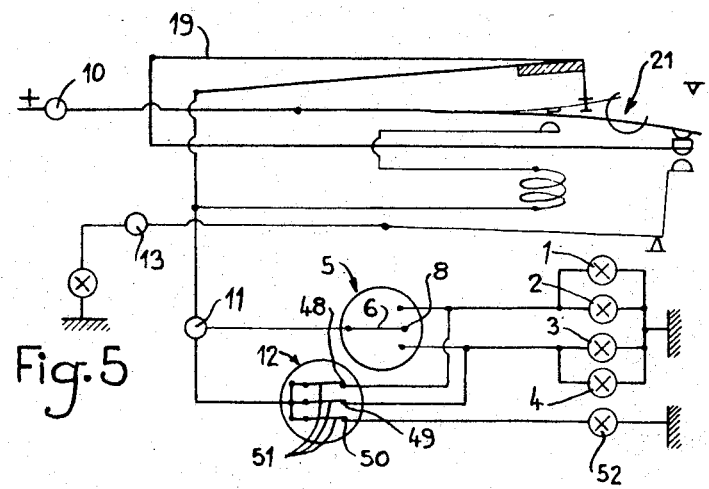

A flasher unit for a motor vehicle will now be described by way of example of the invention, with reference to the accompanying drawings in which:

FIGURE 1 is a schematic diagram showing the operation of the flasher unit according to the invention during the preliminary phase of lighting the lamps, FIGURE 2 is a diagram similar to FIGURE 1, but represents the unit during the main phase of lighting, FIGURE 3 is another diagram similar to FIGURE 1, but illustrates the beginning of the extinguishing phase, before the release of the unstably-balanced tumbler, FIGURE 4 is another diagram similar to FIGURE 1, but illustrating the precise moment when the tumbler passes through its position of unstable balance to bring the whole of the unit back to the position shown in FIGURE 1, FIGURE 5 is another diagram similar to FIGURE 1, showing the switching carried out in emergency to operate the general flashing known as "warning,"

Figure 6:
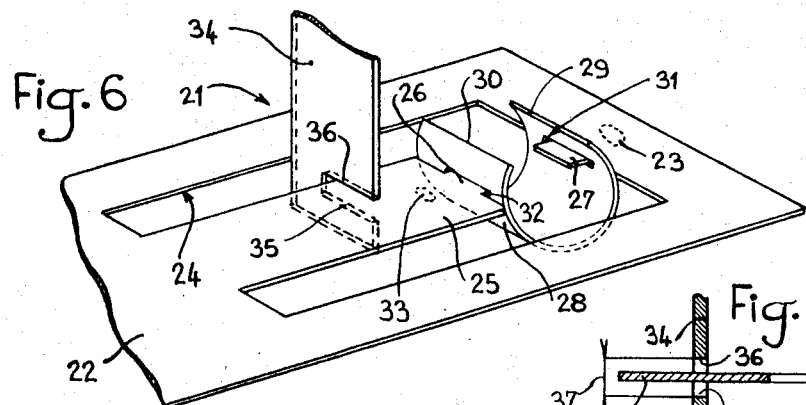
Figure 7:
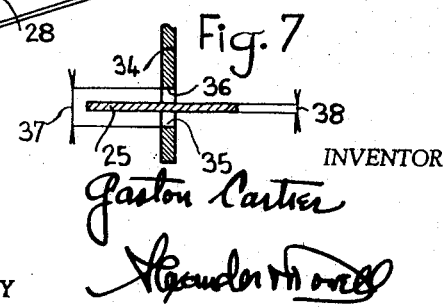

FIGURE 6 is a part-view in perspective showing to a larger scale the detail of the tumbler when in its position of unstable equilibrium, and FIGURE 7 is a part-section showing the play existing between the central tongue of the tumbler and the two fingers of the fork which surround it.

The flasher unit shown in FIGURES 1 to 7 is intended for fitting to a motor vehicle. This latter includes in the usual way indicator lamps situated on the left and right of the coachwork, namely for example: a front right lamp 1, a rear right lamp 2, a rear left lamp 3, and a front left lamp 4. A switch 5 of known type, including a moving contact 6 with three positions designated by points 7, 8 and 9, is provided to make either the right lamps 1 and 2 or the left lamps 3 and 4 flash. This selector switch 5 is operated by hand by the driver. The flasher unit has three connection terminals, which are:

one input terminal 10 which is connected for example to the positive terminal of the vehicle batteries;

one output terminal 11 which is connected to the selector switch 5 and an emergency or "warning" switch 12;

one output terminal 13 provided to ensure the supply to a pilot lamp 14 the other side of which is earthed. The pilot lamp 14 is fitted to the fascia panel of the vehicle so as to be easily visible to the driver.

The unit includes a thermally responsive control device which has a flexible metal blade 15 of which one end 16 is embedded in a rigid support not shown. This blade 15 has a set in the direction of the arrow 17, that is to say its free end 18 tends constantly to return in this direction by its own elasticity. The free end 18 of the blade 15 is attached to one end of a heating wire 19 of which the opposite end is anchored at a fixed point 20 on the support. This assembly is adjusted so that when the wire is cold, the blade 15 is held upward (as in FIGURE 1), whilst as soon as the wire 19 lengthens as a result of its heating, the end 18 tends to depress in the direction of the arrow 17.

In addition, the unit includes a tumbler 21, that is to say a mechanism with two positions of stable equilibrium situated one on each side of a position of unstable equilibrium. The detail of the tumbler is shown in FIGURE 6. This mechanism is essentially formed by a flexible metal blade 22 of which one end 53 is embedded in the insulating support of the assembly, which is not shown.

At its opposite end, the blade 22 is fitted on its lower face with a contact-stud 23. Near this same end, the blade 22 is cut out with an opening 24 into which projects a small tongue 25. The end of this tongue has a lug 26 which projects forward, in the direction of the contact-stud 23. A lug 27 faces the lug 26 on the opposite side of the opening 24. Between these two lugs there is fitted a metal spring 28 rolled back on itself so as to form approximately two-thirds or three-quarters of a cylinder. The opposite rectangular ends 29 and 30 of this spring are arranged following the generating lines of the cylinder parallel to the overall plane of the blade 22. In addition, there is provided, near to the end 29 and parallel to it, a slot 31 cut in the wall of the spring 28. Similarly, a slot 32 pierces the wall of the spring 28 near to the end 30.

The assembling of the tumbler is carried out by engaging the spring 28 in the compressed state between the lugs 26 and 27, which it surrounds by the slots referenced respectively 32 and 31. The assembly then has a position of unstable equilibrium (FIGURES 4 and 6) in which the spring 28 remains compressed between the lugs 26 and 27, when it tends to force these latter apart by bending the small tongue 25 in relation to the blade 22, either in the direction shown in FIGURE 1 or in the opposite direction as illustrated in FIGURE 2. The spring 28 could be completely cylindrical the essential feature being that its connection with the lugs 22 and 27 must be on the same side of its diametral plane.

The tongue 25 carries a contact stud 33 on its lower surface, near to the lug 26.

In order to trip the tumbler 21 in one direction or the other about its position of unstable equilibrium, a fork 34 is used, of which the two fingers are engaged transversely about the tongue 25. These fingers are formed by the lower edge 35 and upper edge 36 of a transverse slot cut in the side of a small plate which constitutes the body of the fork 34 (FIGURES 6 and 7). It is important to note that a considerable play is provided in this, that is to say that the distance 37 between the edges 35 and 36 is appreciably larger than the thickness 38 of the tongue 25.

The opposite end of the fork 34 is attached to an insulating support 39 (FIGURE 1) which is firmly fixed onto the set blade 15, flush with its free end 18.

A fixed contact stud 40 is connected electrically to the fixed point 20 of the heating wire 19. The upper face of this stud 40 serves as a stop for the stud 23 when the tumbler 21 occupies the position illustrated in FIGURES 1 and 5. On the other hand, when the tumbler 21 is deflected in the opposite direction, the stud 23 is checked by a fixed stop 41, against which the end of the blade 22 bears, at the back of the stud 23 (FIGURES 2 and 3).

Another fixed contact stud 42 is provided below the moving stud 33 of the tumbler 21 in order to act as a stop for it when the assembly is in the position illustrated in FIGURE 2. This stud 42 is connected electrically to one end of a solenoid 43, of which the other end is connected to the output terminal 11, as is also the end 16 of the blade 15. When the solenoid 43 has an electric current passing through it, it attracts, in the direction of the arrow 44, a moving tongue 45 which is embedded at one of its ends 146, and which without this would tend to spring in the direction opposite to the arrow 44, as a result of its own elasticity.

This tongue 45 carries at its free end a contact stud 46 which is able to come to bear against the lower face of the contact stud 40 when the solenoid 43 is activated. On the contrary, when no current is flowing through the solenoid 43, the contacts 40 and 46 are apart and the tongue 45 rests on an insulating stop 47 (FIGURES 1 and 3).

According to a manufacturing method preferred of the invention, the tongue 45 itself is used as a sounder when it strikes against the stop 47.

The embedded end 146 of the blade 45 is connected electrically to the output terminal 13 of the unit.

To complete the assembly, there is looped out from the output terminal 11 the "warning" switch 12 which carries three fixed contacts 48, 49 and 50, which a movable toggle 51 allows either to be connected in parallel (FIGURE 5) or to be isolated one from the others and from the terminal 11 when the switch is open (FIGURES 1 to 4).

The contact 48 is connected to the right-hand lamps 1 and 2, the contact 49 allows the left-hand lamps 3 and 4 to be supplied; finally the contact 30 is connected to one of the terminals of a pilot lamp 52, of which the other terminal is earthed. This pilot lamp 52 is preferably included on the instrument panel of the vehicle, and it flashes at the same time as all the lamps 1, 2, 3 and 4 when the "warning" switch 12 has been closed in an emergency.

The operation is as follows:

When the driver wishes to flash the lamps 3 and 4 to signal that he is going to turn left, it is sufficient for him to bring the movable toggle 6 of the switch 5 to the position 9 shown in FIGURES 1 and 4, while the "warning" switch remains open.

In a first phase (FIGURE 1) the lamps 3 and 4 light immediately by the action of the electric current which they receive by the following path: terminal 10, contacts 23 and 40, wire 19, blade 15, terminal 11, switch 5. The lamps 3 and 4 are fitted in series with the wire 19, and during this short initial phase they light with reduced intensity because of the resistance of the wire.

The wire 19 lengthens as it heats up, and it frees the blade 15 which descends in the direction of the arrow 17. The fork 34 follows this movement, and it trips the tumbler 21 which then comes to the position illustrated in FIGURE 2. The contact 23 is then separated from the contact 40, while the contact 33 of the tongue 25 is applied to the fixed contact 42. The tumbler 21 guarantees a sharp, instantaneous break.

The electric current then reaches the lamps 3 and 4 by the following path: terminal 10, contacts 33 and 42, solenoid 43, output terminal 11, switch 5. It will be noted that the lamps 3 and 4 are then fed directly from the terminal 10, the wire 19 being cut out of their circuit. Thus there is obtained the main phase of lighting of the lamps 3 and 4 which work at full intensity, whatever their power. It will be seen that this allows the unit to be used on installations of varying types, notably including a "warning" switch.

During this phase, the solenoid 43 being energised, the contact 46 is applied against the contact 40, which causes the pilot lamp 14 (FIGURE 2) to light, its current flowing via the following path: input terminal 10, contacts 33 and 42, solenoid 43, end 16 of the blade 15, end 18 of this same blade, wire 19, contacts 40 and 46, output terminal 13.

Given that care has been taken to utilise a pilot lamp 14 of high internal resistance, the intensity of the current which then flows through the wire 19 is very small, being possibly, for example, equal to $\frac{1}{12}$ of what is passed during the preceding phase (FIGURE 1). In consequence, although the lamp 14 lights (FIGURE 2), the wire 19 cools progressively.

During the beginning of the cooling, the contraction in the wire 19 which results from it and the corresponding displacement of the insulated stop 39 in the direction of the arrow 48 (FIGURE 3) are used to take up the play of the prongs of the fork 34. In other words, while at the beginning of the phase of lighting of the lamps 3 and 4 (FIGURE 2), the upper edge 36 of the fork 34 was in contact with the tongue 25, the said fork 34 is progressively raised in proportion as the wire 19 cools, until the lower edge 35 comes to bear against the tongue 25. At this moment, the tongue 25 is in its turn drawn in the direction of the arrow 48, which causes the separation of the contacts 33 and 42. From this results the extinguishing of the lamps 3 and 4, as does the cutting out of circuit of the solenoid 43, which causes the separation of the contacts 40 and 46 and, in consequence, the extinguishing of the pilot-lamp 14. The progressive raising of the tongue 25 brings this latter to the position of unstable equilibrium shown in FIGURES 4 and 6, so that soon afterwards the tumbler 21 trips in the opposite direction to return to the position shown in FIGURE 1. The wire 19 has then again an appreciable current flowing through it, and the cycle begins once more.

Naturally, if the driver wishes to turn to the right, it is sufficient for him to bring the movable toggle 6 of the selector switch 5 to position 7, which causes the flashing of lamps 1 and 2 according to a similar sequence.

In an emergency, for example when the vehicle is immobilised at night on a road carrying heavy traffic, the driver closes the "warning" switch 12 in order to cause the simultaneous flashing of all the lamps 1, 2, 3 and 4, while the movable toggle 6 of the selector switch 5 remains in the neutral position 8. The flashing sequence is then identical to that which has been described above, principally as regards the sharp breaks obtained thanks to the tumbler 21. As has been pointed out, the output terminal 11 is connected directly to the input terminal 10 during the main phase of lighting of the lamps (FIGURE 2), so that everything happens as though the lamps 1, 2, 3 and 4 as well as the pilot-lamp 52 were all connected in parallel directly to the input terminal 10. These lamps therefore flash without there being need to relate their power proportionately to the electrical characteristics of the heating wire 19.

I claim:

1. A flasher unit for vehicles, to be inserted between an electric source and electric lamps, comprising:
  a first and a second terminal;
  a snap-acting device including a first snapping member movable between a first and a second position, a second snapping member also movable between a first and a second position, and spring means interposed between said first and second snapping members to cause any one of same to snap from its second position to its first position when the other one is displaced from its first position to its second position, and also to snap from its first position to its second position when the other one is displaced from its second position to its first position;
  a first movable contact carried by said first snapping member, said first movable contact being connected with said first terminal;
  a first fixed contact to cooperate with said first movable contact when said first snapping member is at its second position, said first fixed contact being connected with said second terminal;
  a second movable contact carried by said second snapping member;
  a second fixed contact to cooperate with said second movable contact when said second snapping member is at its second position;
  a heat-extensible wire having a fixed end and a movable end, said wire being inserted in series with said second movable contact and said second fixed contact between said first and second terminal;
  an actuating arm having a movable end to which said movable end of said heat-extensible wire is attached, said arm being resiliently urged in such a direction as to maintain said wire under tension;
  and means to mechanically connect said actuating arm with said first snapping member in such manner that in the cool state of said heat-extensible wire said first snapping member is maintained at its first position, that as said wire is heated by passage of electric current therethrough, said actuating arm displaces said first snapping member towards its second position, and that when thereafter said wire cools, said actuating arm returns said first snapping member towards its first position.

2. In a flasher unit as claimed in claim 1, a third terminal for a pilot-lamp, and a relay to control energization of said pilot-lamp, said relay including a winding inserted between said first fixed contact and said second terminal.

3. In a flasher unit as claimed in claim 2, said relay including a movable relay contact to cooperate with said second fixed contact when said relay winding is energized.

4. In a flasher unit as claimed in claim 1, said means to mechanically connect said actuating arm with said first snapping member providing a lost motion in such manner that when said heat-extensible wire cools, the displacement of said first snapping member from its second position towards its first position is delayed.

References Cited

UNITED STATES PATENTS

| | | | |
|---|---|---|---|
| 2,521,277 | 9/1950 | Aubert | 337—131 X |
| 2,689,283 | 9/1954 | Pulvari | 337—125 |
| 2,769,890 | 11/1956 | Hallerberg et al. | |
| 3,289,158 | 11/1966 | Olson | 340—75 |
| 3,302,173 | 1/1967 | Konz et al. | 340—81 |
| 3,358,160 | 12/1967 | Bleiweiss et al. | |

FOREIGN PATENTS

| | | |
|---|---|---|
| 1,099,819 | 3/1955 | France. |
| 1,163,807 | 5/1958 | France. |

JOHN W. CALDWELL, Primary Examiner

K. N. LEIMER, Assistant Examiner

U.S. Cl. X.R.

337—138, 140; 340—80, 81